United States Patent [19]

Kronogård et al.

[11] 4,417,551
[45] Nov. 29, 1983

[54] VEHICLE ENGINE

[75] Inventors: Sven-Olof Kronogård, Karstorpsvägen 31, Lomma, Sweden, 23400; Clas-Olof Kronogård, Grabo, Sweden; Hakan Kronogård, Lund, Sweden

[73] Assignee: Sven-Olof Kronogård, Lomma, Sweden

[21] Appl. No.: 290,936

[22] Filed: Aug. 7, 1981

[30] Foreign Application Priority Data

Sep. 29, 1980 [SE] Sweden .............................. 8006807

[51] Int. Cl.³ .............................................. F02D 17/02
[52] U.S. Cl. .............................. 123/198 F; 123/DIG. 8
[58] Field of Search ...... 123/198 F, DIG. 6, DIG. 7, 123/DIG. 8

[56] References Cited

U.S. PATENT DOCUMENTS 2,186,043  1/1940  Rohlin .......................... 123/198 F
3,744,934  7/1973  Ueno ............................ 123/198 F
4,069,803  1/1978  Cataldo ........................ 123/198 F Primary Examiner—Ira S. Lazarus
Attorney, Agent, or Firm—Cantor and Lessler

[57] ABSTRACT

In order to improve the fuel economy of a vehicle engine, its cylinders are divided into two groups, which are operable independently of each other. The fuel system is adapted to supply either, or both groups with fuel. The crank shaft of one cylinder group is connectable to the power take-off shaft by means of conventional transmission and clutch means, while the crank shaft of the other cylinder group is connectable to the power take-off shaft by way of a transmission arrangement running in parallel to the row of cylinders, and comprising a shaft. The auxiliaries of the engine are mounted at the end of the engine remote from the power take-off shaft, and can be driven from either group of cylinders by way of the transmission arrangement.

10 Claims, 3 Drawing Figures

VEHICLE ENGINE

BACKGROUND OF THE INVENTION

In order to obtain a good fuel economy with vehicle engines it has been proposed to arrange the operating process in such a manner that certain engine cylinders may be cut out when a low power output is required. This can be attained by in different ways and presupposes a fuel supply system, which permits the switching in and switching out the cylinders in question. On most occasions the pistons and the associated crank mechanism in these cylinders remained connected to the crank shaft, which causes wear and friction losses.

The aim of the present invention is to propose a vehicle engine, which is well suited for series production, and where it is possible to cut out a desired number of cylinders without any unnecessary frictional losses.

The invention is characterized in that the cylinders are arranged in two groups, each with an associated crank shaft part and operable by itself, that one crank shaft part by conventional clutch means is connectable to a power take-off shaft, and that the other crank shaft part is connectable to the power take-off shaft by transmission means running in parallel to the row of cylinders.

Each group of cylinders can be arranged in a separate engine block, the two blocks being interconnected to one unit. Alternatively all cylinders are located in a common engine block, the ends of the crank shafts being carried in a common bearing. The division between the crank shaft parts is preferably, but not necessarily, located adjacent to a cylinder from which the piston and the associated crank mechanism has been removed.

One group of cylinders may include a bigger number of cylinders than the other group. At least one of the cylinder groups may be provided with a balancing shaft (shafts).

The transmission means preferably includes parts adapted to permit a variation of the speed, for instance by the transmission means including a non-mechanical component.

Auxiliaries associated with the engine are preferably mounted at the end of the engine remote from the output shaft and the transmission means includes clutches permitting operation of the auxiliaries from either group of cylinders.

The smaller group of cylinders is preferably built-up of components substantially made of ceramic material, and this group is intended for operation with a high thermal load.

DESCRIPTION OF SOME PREFERRED EMBODIMENTS

To facilitate series production it is favourable to be able to operate with a reduced number of base components. One way is to produce two blocks, one with two and one with three cylinders of the same diameter, and to combine those two+two, two+three or three+three cylinders to obtain an engine of a desired power rating. Alternatively it is possible to use a standard engine block, for instance for a six-cylinder engine, and to remove the piston and the associated crank mechanism from one of the cylinders, and to divide the crank shaft adjacent to this cylinder. It will of course also be possible here to use crank shafts for one two-cylinder and one three-cylinder engine.

A pre-condition is of course that each group of cylinders will form an operable unit, and that the fuel supply system is adapted to the part load operation.

Figure 1:
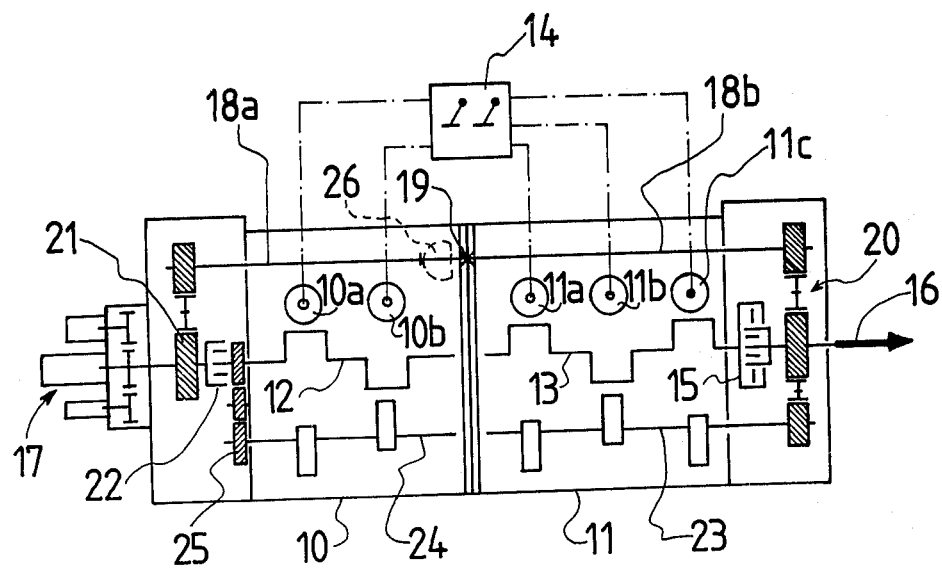
FIG. 1 shows an engine according to a first embodiment of the invention, and containing two plus three cylinders, arranged in separate blocks being built together to a unit.

FIG. 1 shows an engine comprising one block 10 enclosing two cylinders (10a, b) and one block 11 enclosing three cylinders (11a, b, c), the blocks being interconnected in any suitable manner to form a rigid unit. The crank shaft associated with two blocks 10, 11 are denoted by 12 and 13, respectively, and they are in this embodiment free from each other.

The fuel supply system is schematically denoted by 14, and is arranged so it can supply fuel either solely to cylinders 10a, b or solely to cylinders 11a, b, c, or alternatively to all cylinders simultaneously.

The crank shaft 13 is by way of a lock-up free-wheel clutch 15 connected to the power take-off shaft 16. The necessary auxiliaries, such as cooling water pump, electric generator, a.s.f., are generally denoted by 17, and are located at the end of the engine remote from the power take-off shaft 16.

A transmission shaft 18 runs along the engine, in parallel to the crank shafts. The transmission shaft is divided in parts 18a, 18b having the same lengths as the blocks 10 and 11, and they are rigidly interconnected by means of a locking device 19.

Between the free-wheel clutch 15 and the power take-off shaft 16 a first transmission 20 is provided for connection to transmission shaft part 18b. At the opposite end of the engine there is a second transmission 21, which by way of a free-wheel 22 connects the crank shaft part 12 with the transmission shaft part 18a.

As required by the occasional power output demand either or both groups of cylinders may be kept operative. Cylinders 11a, b, c will, with engaged clutch 15, drive the power take-off shaft 16 directly, and the auxiliaries 17 by way of the first transmission 20, the transmission shaft 18 and the second transmission 21. The free-wheel 22 will permit the crank shaft part 12 to remain at stand-still.

If it is sufficient to use cylinders 10a, b only, these will drive the auxiliaries 17 directly and the power take-off shaft 16 by way of the transmission components 21, 18 and 20. The free-wheel clutch 15 is then disengaged.

It may be difficult to obtain a smooth running with two or three cylinders only, especially as it is desirable sometimes to interconnect the two groups. With high requirements for smooth running each cylinder group is provided with at least one balancing shaft 23 and 24, respectively, of known design. The balancing shaft 23 is driven from the first transmission 20, but for the balancing shaft 24 there is a separate transmission 25, directly connected to crank shaft part 12.

For ordinary driving the three cylinders 11a, b, c will be sufficient on most occasions, and the two cylinders 10a, b are switched in, whenever needed. Within the scope of the invention remains the possibility to manufacture the pistons, the valves, and the cover for the cylinders in block 10 of ceramic material, which permits a high thermal load. The two cylinders 10a, b can thus, in case of need, deliver a noticeable addition to the power output. Such an engine will have a small inertia so it can be accelerated rapidly. The vibration level will also be low, and on many occasions it may be sufficient to provide the transmission shaft 18 with balancing weights, whereby a separate balancing shaft will be unnecessary.

The transmission shaft 18 may possibly include a hydrodynamic or hydrostatic torque converter 26 (shown in broken lines), or some other component, which makes it possible to operate the group of cylinders 10a, b at a speed independent of that of crank shaft part 13. Hereby a dampening of torsional vibrations will be attained, and the running will be more smooth.

The engine can be provided with an exhaust gas turbine driving a charging air compressor, but as such arrangements are well known in the art, no supercharger is shown in the drawing.

Figure 2:
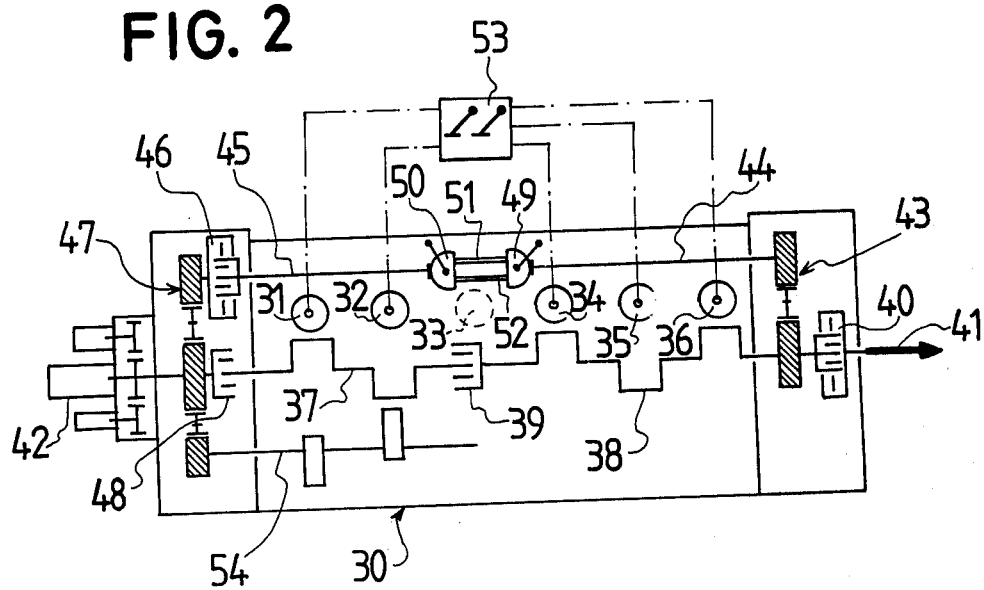
FIG. 2 shows an engine according to a further embodiment of the invention and containing five operating cylinders in a six-cylinder block.

FIG. 2 shows a modified embodiment of the invention, where the engine is based upon an engine block 30 for a standard six-cylinder engine, having cylinders 31-36. The piston and the associated crank mechanism have been removed from cylinder 33 (indicated in broken lines), and the crank shaft has been divided into two parts 37, 38, adjacent to this cylinder. The juxtaposed ends of the crank shaft parts are carried in a common bearing 39, which possibly may contain a free-wheel of the type to be described in connection with FIG. 3.

The crank shaft part 38 may, by way of a free-wheel clutch 40 be connected with the power take-off shaft 41. The auxiliaries 42 associated with the engine are located at the end of the engine remote from the power take-off shaft 41, and may be driven from either group of cylinders by means of a transmission device in the same manner as described above.

A first transmission 43 connects the crank shaft part 38, with a transmission shaft part 44. A second transmission shaft part 45 is, by way of a free-wheel clutch 46, connected to a second transmission 47, from which the engine's auxiliaries 42 are driven. The transmission is, in turn, driven from crank shaft part 37 by way of a free-wheel 48.

The transmission shaft parts 44 and 45 can be connected directly to each other as in the previous figure, but are here adapted each to drive a hydraulic machine 49, 50, for instance of the swash-plate type, which may function either as a pump, or as a motor. The two machines are interconnected by short conduits 51 and 52 for the circulation of operating fluid.

The fuel system of the engine is denoted by 53 and is designed to operate in the same manner as described in connection with FIG. 1. Here only cylinder group 31, 32 is provided with a balancing shaft 54, driven by the second transmission 47. The two hydraulic machines may be integrated to a single unit, which has a low weight and a minimum of losses.

Figure 3:
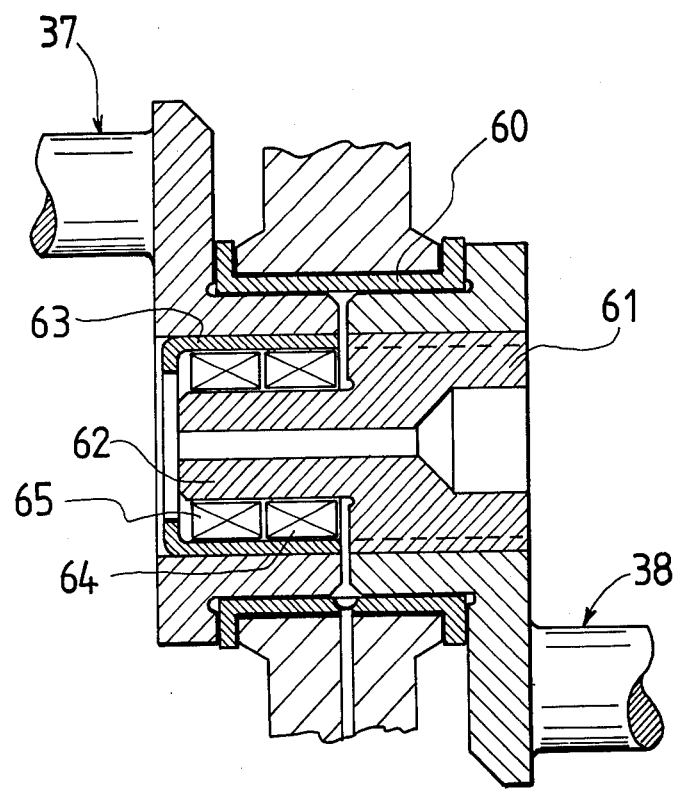
FIG. 3 shows an arrangement for interconnecting the ends of the crank shafts.

A device for interconnecting the ends of the crank shaft parts 37 and 38 is shown in FIG. 3. The shaft ends are primarily carried in a bearing 60 mounted in the engine block. Crank chaft part 38 is provided with an insert 61, having a polygonal cross section, and provided with a projecting trunnion 62. In the opposite crank shaft part 37 there is a tubular insert 63, fitted in a mating recess. The inward wall face of the insert is formed as the outer race of a free-wheel. The trunnion 62 is formed as the inner race of the free-wheel, and between the two races two sets of roller bodies 64 and 65 are fitted for increasing the torque transfer.

When no free-wheel action is needed the components 62-65 will be formed as parts of a conventional journal, needle or roller bearing.

The embodiments described above, and shown in the drawings are examples only of the invention, the details of which may be varied in many ways within the scope of the appended claims. The total number of cylinders, and the sub division thereof into groups can easily be made to match various output demands. With the embodiment according to FIG. 2, it will of course be possible to start with a five-cylinder block, which will provide two plus two operable cylinders. The invention will of course also be applicable to V-engines.

What we claim is:

1. A vehicle enging having a number of cylinders arranged in at least one row and provided with a fuelling system permitting selective supply of fuel to two distinct groups of cylinders within said at least one row, and further comprising:
   (A) first and second aligned crank shafts each associated with the cylinders in one of said two groups,
   (B) first clutch means for selectively connecting said first crank shaft with a power take-off shaft from the engine,
   (C) transmission means including a shaft running in parallel to said at least one row of cylinders and engageable with said first crank shaft,
   (D) second clutch means for selectively connecting said second crank shaft with said transmission, and
   (E) whereby either one, or both, of said two groups of cylinders can be selectively connected to said power take-off shaft to drive the same.

2. The vehicle engine according to claim 1, in which each group of cylinders is located in a separate engine block, the two blocks being interconnected to one unit.

3. The vehicle engine according to claim 1, in which all cylinders are located in a common engine block, the juxtaposed ends of said first and second crank shafts being carried in a common bearing.

4. The vehicle engine according to claim 3, in which the plane of division between said first and second crank shafts is located adjacent to a cylinder in said at least one row from which the piston and the associated crank mechanism has been removed.

5. The vehicle engine according to claim 1, in which one group of cylinders includes a smaller number of cylinders than the other group.

6. The vehicle engine according to claim 1, in which at least one of said cylinder groups is provided with a balancing shaft.

7. The vehicle engine according to claim 1, characterized in that said transmission means includes a non-mechanical component.

8. The vehicle engine according to claim 7, in which said transmission means includes parts adapted to permit a variation of the speed of said second crank shaft.

9. The vehicle engine according to claim 1, in which auxiliaries associated with the engine are mounted at the end of the engine remote from said power take-off shaft, and the transmission means includes clutches permitting operation of the auxiliaries from either of said groups of cylinders.

10. The vehicle engine according to claim 5, in which said smaller group of cylinders is built-up of components substantially made of ceramic material, and that said group is intended for operation with a high thermal load.

* * * * *